(12) United States Patent
Zhou

(10) Patent No.: US 10,652,517 B2
(45) Date of Patent: May 12, 2020

(54) VIRTUAL REALITY 360-DEGREE VIDEO CAMERA SYSTEM FOR LIVE STREAMING

(71) Applicant: Visbit Inc., Sunnyvale, CA (US)

(72) Inventor: Changyin Zhou, San Jose, CA (US)

(73) Assignee: Visbit Inc., Sunnyvale, CA (US)

( * ) Notice: Subject to any disclaimer, the term of this patent is extended or adjusted under 35 U.S.C. 154(b) by 0 days.

(21) Appl. No.: 15/616,558

(22) Filed: Jun. 7, 2017

(65) Prior Publication Data

US 2017/0352191 A1 Dec. 7, 2017

Related U.S. Application Data

(60) Provisional application No. 62/347,077, filed on Jun. 7, 2016.

(51) Int. Cl.
*H04N 13/194* (2018.01)
*H04N 21/2343* (2011.01)
(Continued)

(52) U.S. Cl.
CPC ....... *H04N 13/194* (2018.05); *H04N 5/23238* (2013.01); *H04N 5/2628* (2013.01); *H04N 13/189* (2018.05); *H04N 21/2181* (2013.01); *H04N 21/2187* (2013.01); *H04N 21/21805* (2013.01); *H04N 21/2343* (2013.01);
(Continued)

(58) Field of Classification Search
CPC combination set(s) only.
See application file for complete search history.

(56) References Cited

U.S. PATENT DOCUMENTS 9,204,041 B1 * 12/2015 Campbell ............ H04N 13/239
2004/0100443 A1 * 5/2004 Mandelbaum ............ F41H 5/26
345/158
(Continued)

FOREIGN PATENT DOCUMENTS

WO 2016024892 2/2016

OTHER PUBLICATIONS

International Search Report, International Application No. PCT/US2017/036385, dated Oct. 30, 2017.
(Continued)

*Primary Examiner* — Alexander Gee
(74) *Attorney, Agent, or Firm* — McDonnell Boehnen Hulbert and Berghoff LLP

(57) ABSTRACT

The present disclosure relates to imaging systems and methods that include a plurality of cameras configured to capture video image data based on respective fields of view of an environment. Each camera of the plurality of cameras is communicatively coupled to neighbor cameras of the plurality of cameras via a communication interface. Each camera may carry out operations include capturing video image data of the respective field of view and determining an overlay region. The overlay region includes an overlapping portion of video image data captured by the respective camera and at least one of the neighbor cameras. The operations also include cropping and warping the captured video image data of the respective field of view based on the overlay region to form respective processed video image data. The processed video image data may be uploaded to a cloud server and provided, via multiple trunk links, to a client device.

13 Claims, 14 Drawing Sheets

(51) Int. Cl.
    H04N 21/218      (2011.01)
    H04N 13/189     (2018.01)
    H04N 21/81      (2011.01)
    H04N 21/2187    (2011.01)
    H04N 21/234     (2011.01)
    H04N 5/262      (2006.01)
    H04N 21/854     (2011.01)
    H04N 5/232      (2006.01)

(52) U.S. Cl.
    CPC ..... *H04N 21/23424* (2013.01); *H04N 21/816* (2013.01); *H04N 21/8173* (2013.01); *H04N 21/854* (2013.01)

(56) References Cited

U.S. PATENT DOCUMENTS

| | | | | |
|---|---|---|---|---|
| 2004/0263636 A1* | 12/2004 | Cutler | ................. | H04N 7/15 348/211.12 |
| 2008/0002023 A1* | 1/2008 | Cutler | ................. | G06T 3/4038 348/36 |
| 2010/0245532 A1* | 9/2010 | Kurtz | ................. | G06K 9/00711 348/14.03 |
| 2010/0271394 A1* | 10/2010 | Howard | ................. | G06F 3/011 345/633 |
| 2011/0199372 A1 | 8/2011 | Mark et al. | | |
| 2011/0214072 A1* | 9/2011 | Lindemann | ............ | G01C 11/02 715/757 |
| 2011/0249095 A1* | 10/2011 | Kim | ................. | G06T 19/006 348/46 |
| 2012/0242787 A1 | 9/2012 | Oh | | |
| 2012/0287222 A1* | 11/2012 | Liu | ................. | H04N 5/23238 348/14.07 |
| 2013/0121261 A1* | 5/2013 | Yao | ................. | H04W 72/0453 370/329 |
| 2013/0124471 A1* | 5/2013 | Chen | ................. | H04N 5/23238 707/624 |
| 2013/0141526 A1* | 6/2013 | Banta | ................. | H04N 5/23238 348/38 |
| 2013/0250040 A1* | 9/2013 | Vitsnudel | ........... | H04N 5/23238 348/36 |
| 2014/0270684 A1* | 9/2014 | Jayaram | ............. | H04N 5/23238 386/224 |
| 2014/0320697 A1* | 10/2014 | Lammers | ................. | H04N 5/76 348/231.99 |
| 2014/0375759 A1* | 12/2014 | Mikes | ................ | H04N 5/23238 348/36 |
| 2015/0084619 A1* | 3/2015 | Stark | ...................... | G01D 5/145 324/207.2 |
| 2015/0095964 A1* | 4/2015 | Teixeira | ............. | H04N 21/2353 725/116 |
| 2015/0138311 A1* | 5/2015 | Towndrow | ......... | H04N 5/23238 348/36 |
| 2015/0316835 A1* | 11/2015 | Scott | .................... | G03B 17/561 396/419 |
| 2015/0346812 A1* | 12/2015 | Cole | .................... | H04N 19/597 345/156 |
| 2016/0088280 A1 | 3/2016 | Sadi et al. | | |
| 2016/0094810 A1* | 3/2016 | Mirza | ................. | G08B 13/196 348/159 |

OTHER PUBLICATIONS

European Patent Office, Extended European Search Report dated Dec. 6, 2019, issued in connection with European Patent Application No. 17810949.2, 15 pages.

Shrestha et al., "Synchronization of Multiple Video Recordings based on Still Camera Flashes," AMC Multimedia 2006 & Co-Located Workshops, Oct. 23, 2006, pp. 137-140.

* cited by examiner

Connect directly

Connect via a center hub device

VIRTUAL REALITY 360-DEGREE VIDEO CAMERA SYSTEM FOR LIVE STREAMING

CROSS-REFERENCE TO RELATED APPLICATIONS

This application is a non-provisional of U.S. Provisional Patent Application No. 62/347,077 filed Jun. 7, 2016, the contents of which are hereby incorporated by reference.

BACKGROUND

Streaming 360-degree video content may provide immersive environments for virtual reality (VR) and augmented reality (AR) applications.

SUMMARY

In an aspect, an imaging system is provided. The imaging system includes a plurality of cameras configured to capture video image data based on respective fields of view of an environment. Each camera of the plurality of cameras is communicatively coupled to neighbor cameras of the plurality of cameras via a communication interface. Each camera of the plurality of cameras includes at least one processor and a memory. The at least one processor executes instructions stored in memory so as to carry out operations. The operations include capturing video image data of the respective field of view and determining an overlay region. The overlay region includes an overlapping portion of video image data captured by the respective camera and at least one of the neighbor cameras. The operations also include cropping and warping the captured video image data of the respective field of view based on the overlay region to form respective processed video image data.

In an aspect, a method is provided. The method includes receiving processed video image data associated with respective cameras of a plurality of cameras of an imaging system. Each camera of the plurality of cameras is configured to capture video images of respective fields of view of an environment. The processed video image data includes cropped and warped video image data based on an overlay region. The overlay region includes an overlapping portion of video image data captured by at least two neighbor cameras of the plurality of cameras. The method also includes providing streamed video to a client device, via a plurality of communication links. The streamed video is based on the processed video image data.

In an aspect, a system is provided. The system includes various means for carrying out the operations of the other respective aspects described herein.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Figure 1:
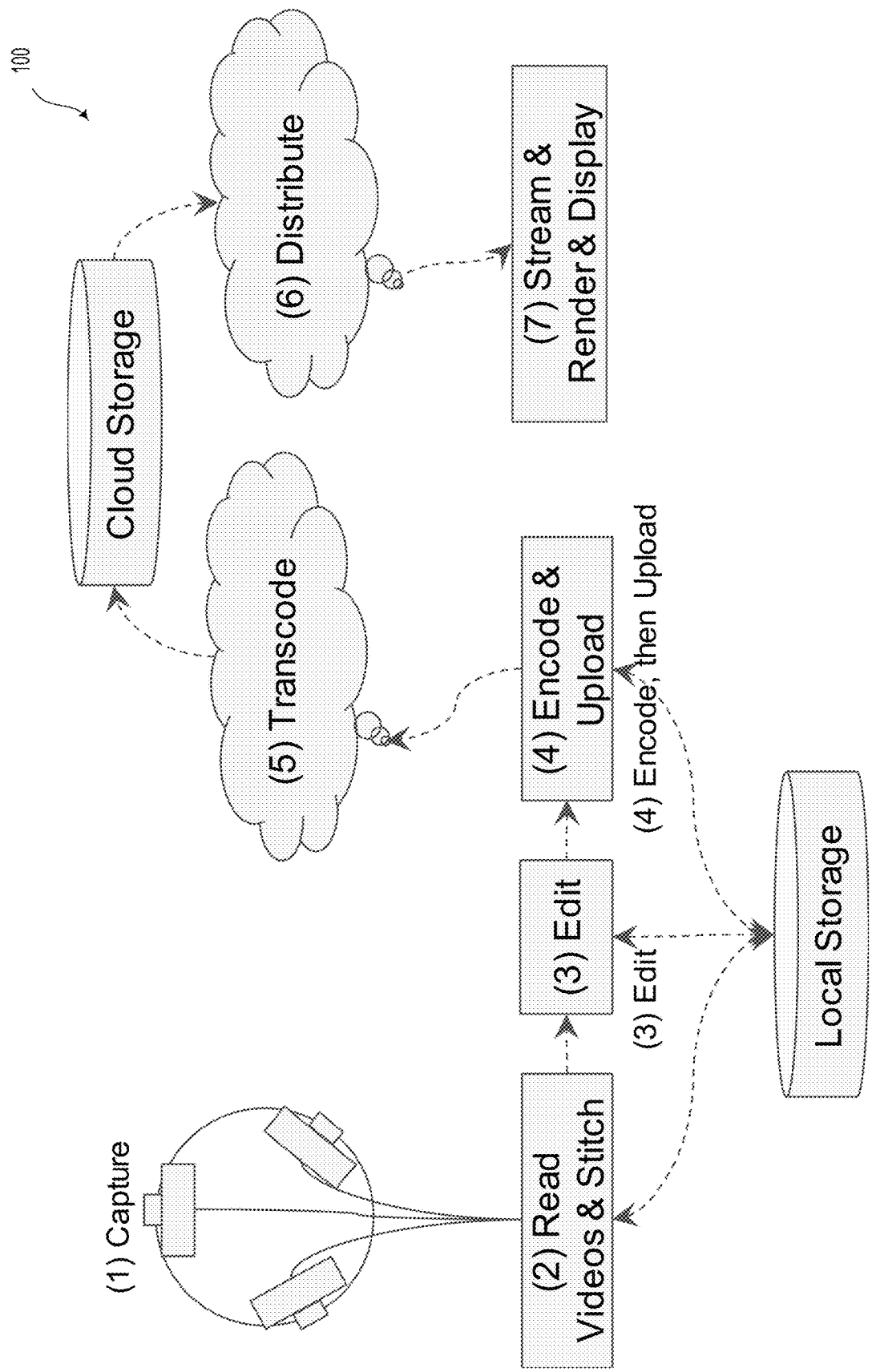
FIG. 1 illustrates a conventional virtual reality 360° video streaming pipeline.

Virtual reality (VR) 360° video has a long pipeline from production to consumption. FIG. 1 illustrates a conventional virtual reality 360° video streaming pipeline 100. (1) It starts with a VR 360° camera, which often consists of multiple cameras. These cameras are mounted to a rig and each camera is arranged to capture a different view angle. These cameras include overlapping fields of view (FOV) to cover the whole 360×180 degree spherical view by image stitching. (2) Data from every camera is read into a processing unit, which aligns and stitches multiple video streams into one 360° stream; (3) the 360° stream then may be edited; (4) the edited video is then encoded and uploaded to cloud; (5) the video is then transcoded in the cloud and be streamingready; (6) video contents are distributed to clients; and (7) client applications receive the contents and render/display them for end-users.

Figure 2:
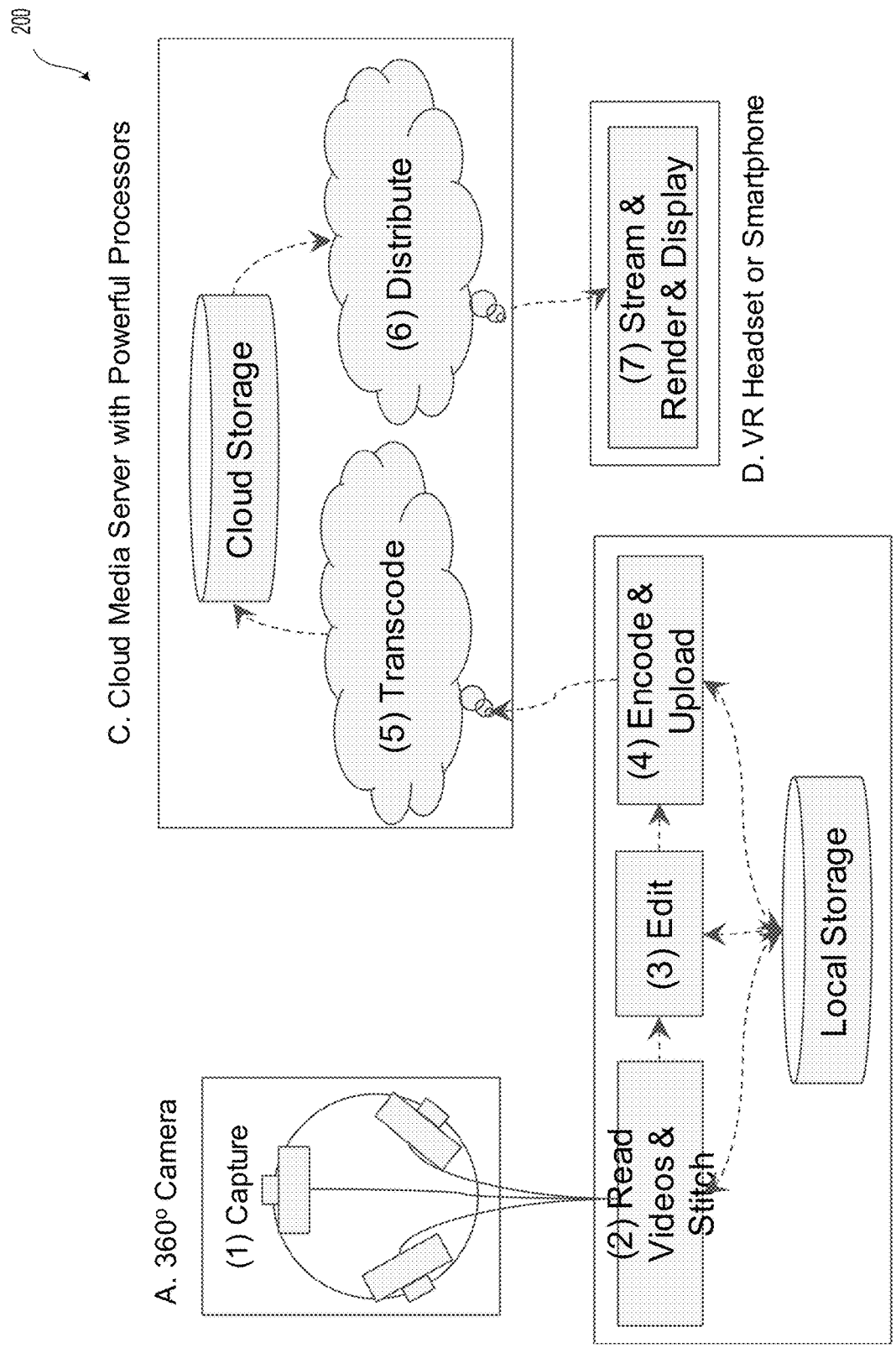
FIG. 2 illustrates a conventional virtual reality 360° video streaming pipeline.

The pipeline may break into a few components in real implementation. For example, FIG. 2 shows a conventional virtual reality 360° video streaming pipeline 200, which consists of A. a 360° camera, B. a powerful computer, C. a powerful cloud server, and D. a VR headset or smartphone. In this configuration. The powerful computer (C) does a lot of heavy work from stitching, editing, encoding, to uploading. Note that a computer receives a huge amount of data from the 360° camera, that stitching and encoding are expensive in computation, that the local storage has to be large enough to accommodate the large data, and that it will take lots of time and bandwidth to upload the processed video to a cloud in Internet. Because of these difficulties, this computer has to be made super powerful (Fast I/O, Lots of memory, Fast CPU or GPU, and fast internet connection), which is expensive. More than that, while the 360° camera can easily scale up to include more cameras for higher quality, it is hard to scale up the powerful computer accordingly. As a result, this solution is usually not able to process the data fast enough for live streaming.

Figure 3:
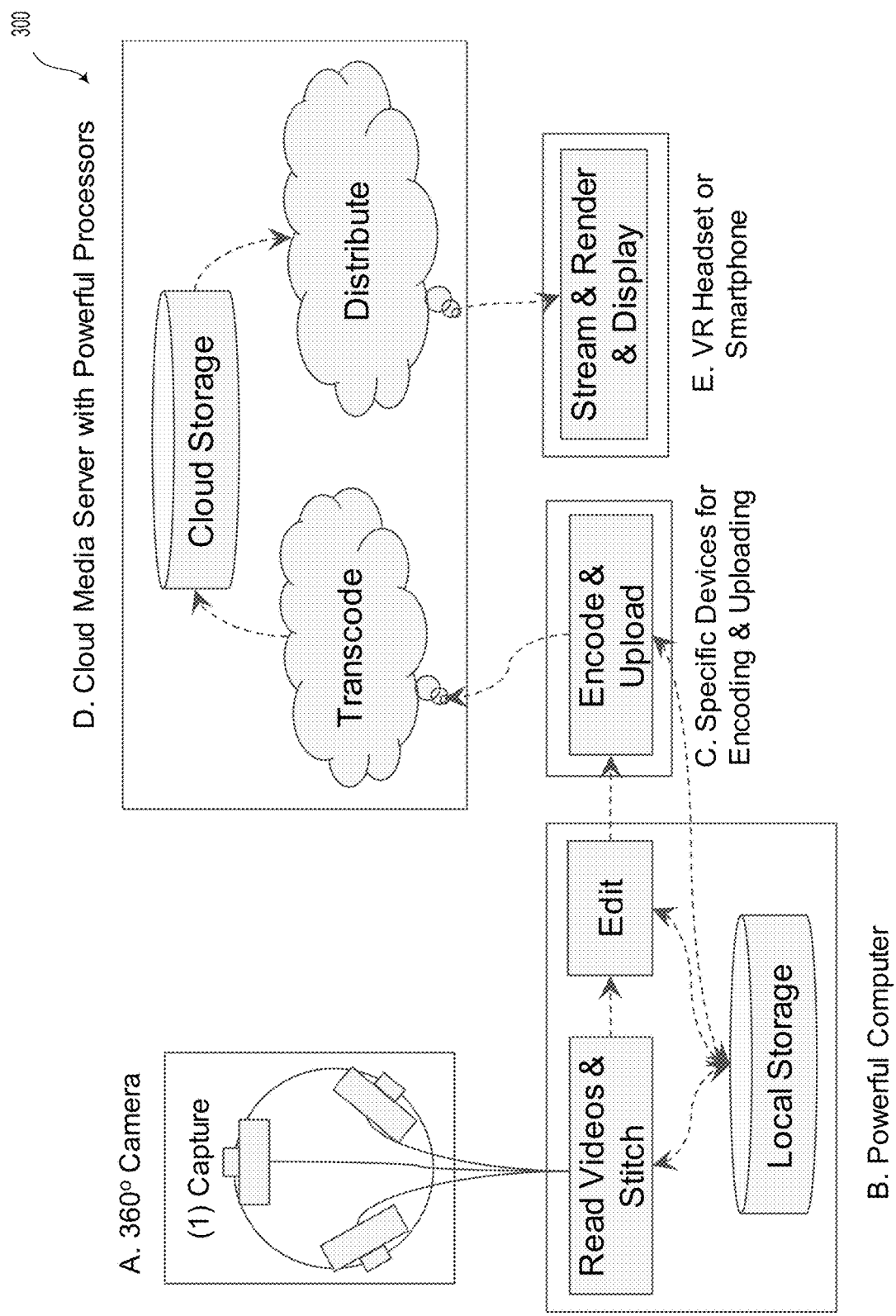
FIG. 3 illustrates a conventional virtual reality 360° video streaming pipeline.

FIG. 3 illustrates a conventional virtual reality 360° video streaming pipeline 300, in which encoding and uploading are done with dedicated device(s), and the powerful compute only deals with video editing and stitching. But again, as the 360° camera scales up, stitching may not be done fast enough for live streaming; and also one dedicate device may not be able to encode high resolution (e.g. 4K, 8K, 12K) video in real time.

Figure 4:
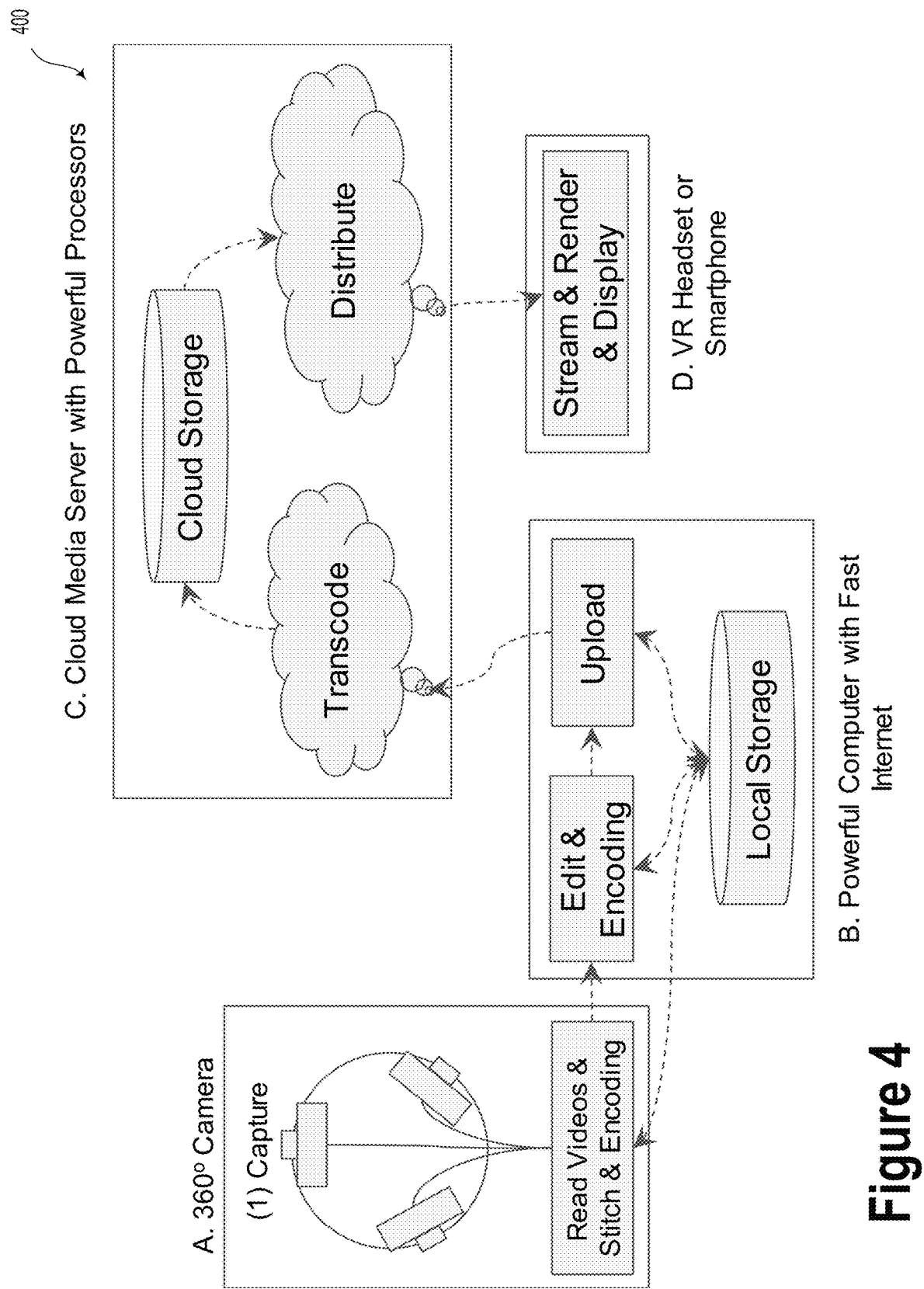
FIG. 4 illustrates a conventional virtual reality 360° video streaming pipeline.

Another a conventional virtual reality 360° video streaming pipeline 400 is illustrated in FIG. 4. Stitching and encoding are done with a hardware solution in the 360° camera, and the powerful computer does further editing and encoding (if necessary) and uploads the final results. In this configuration, the work in the VR camera is often so heavy that it often has to sacrifice video quality and resolution.

Figure 5:
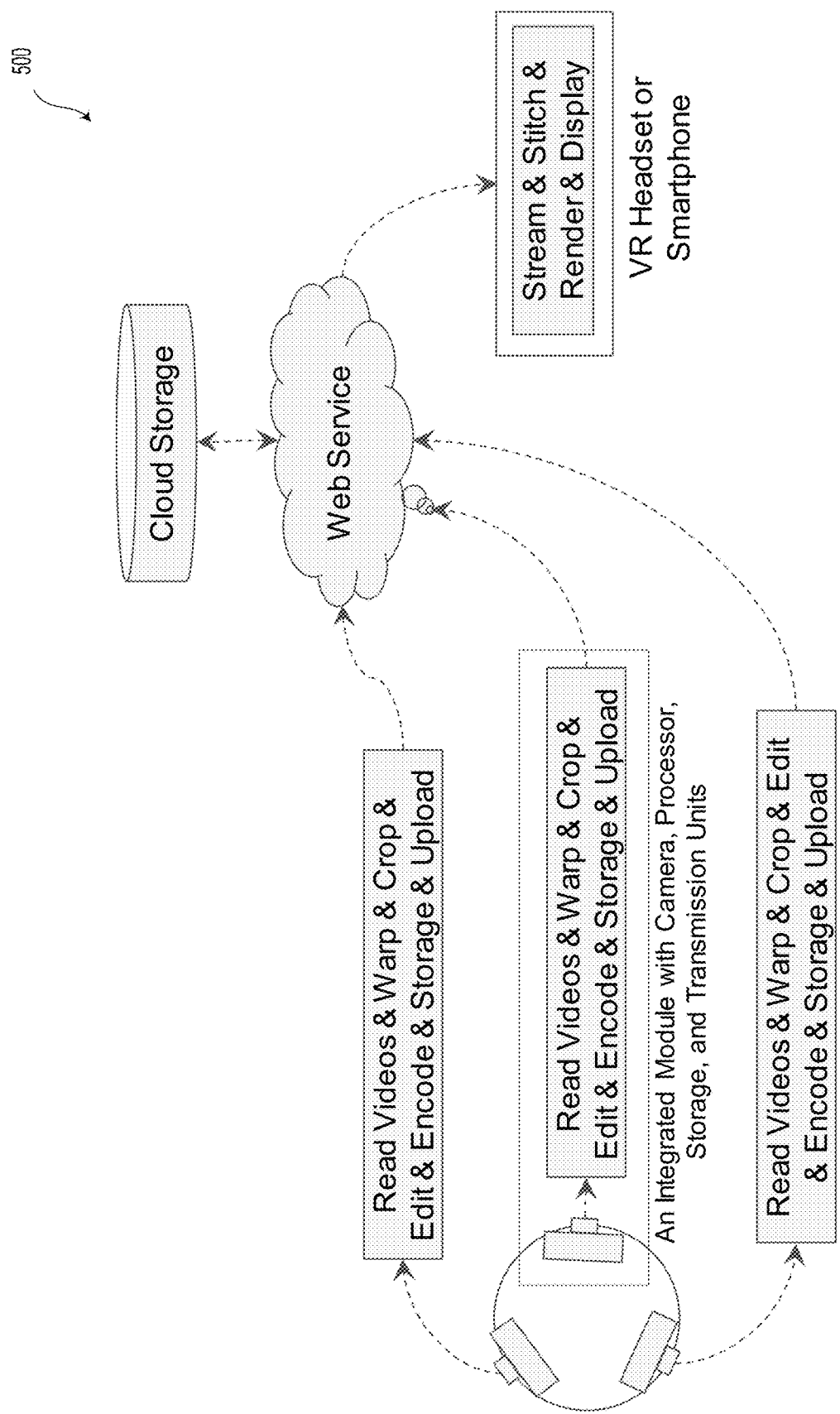
FIG. 5 illustrates a distributed virtual reality 360° video capture, processing, and streaming system, according to an example embodiment.

We propose a distributed infrastructure for VR 360° video capturing and live streaming. FIG. 5 illustrates a distributed virtual reality 360° video capture, processing, and streaming system 500, according to an example embodiment. Each camera of the system is integrated with processors (CPU, GPU), storage, and transmission units. According, each camera may be incorporated into an integrated module. This module may be configured to carry out image capturing, warping, stitching, editing, encoding, transcoding, to uploading, for a small FOV. This VR 360° video camera system consists of K integrated camera modules. These modules communicate with each other for best stitching, and may perform operations in parallel.

Since videos from each integrated camera module have been carefully warped and cropped, no more alignment is needed to stitch them together. One can choose to stitch all videos together in the cloud with relatively low computation cost, or choose to stitch them during rendering on the final display device (e.g., VR headset, smartphone, etc).

II. Example Systems

A. Integrated Camera Unit

Figure 6:
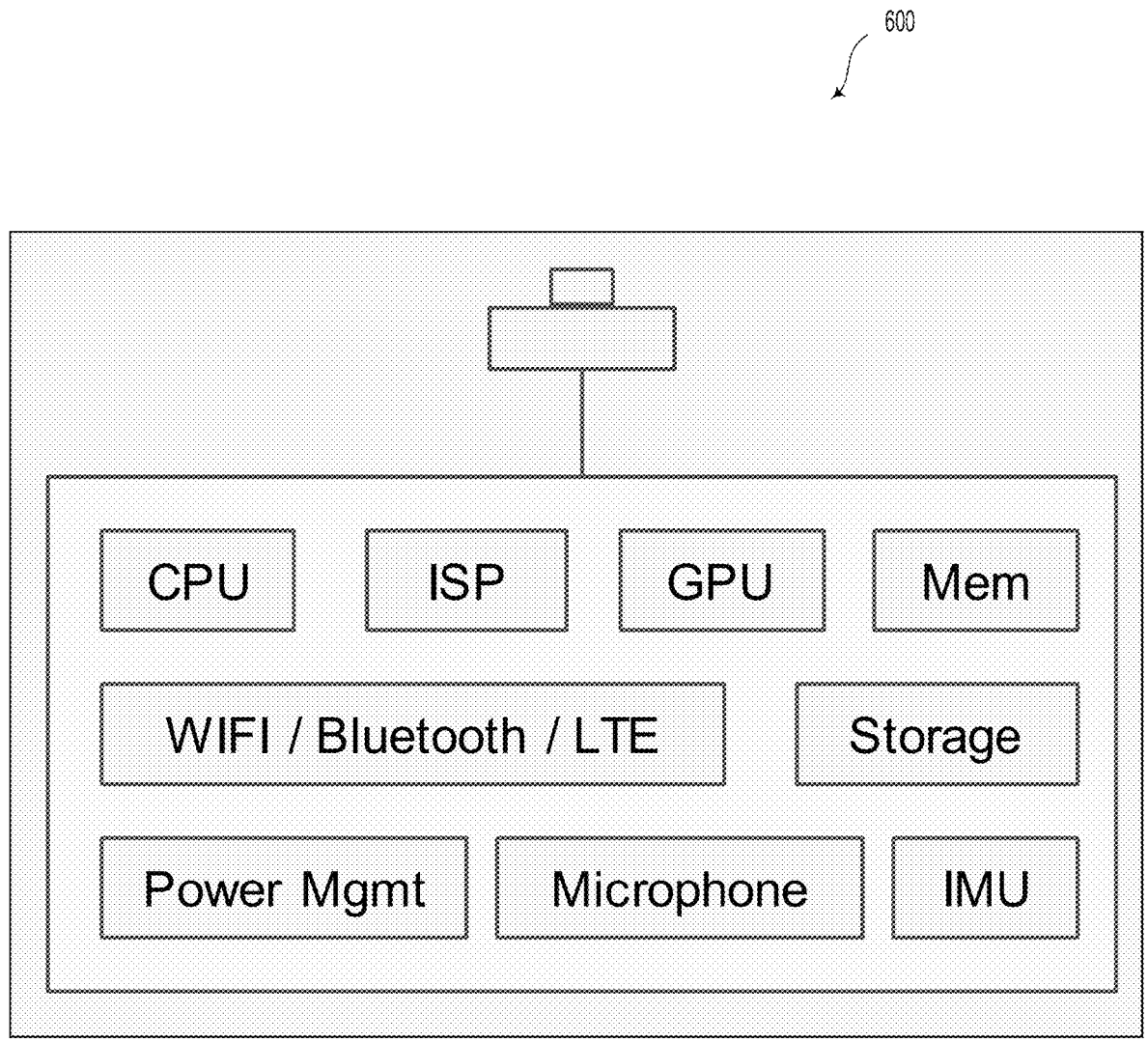
FIG. 6 illustrates system, according to an example embodiment.

In one embodiment, the integrated unit of camera, processor, storage, and transmission modules can be made into one piece of module, as shown in FIG. 6. Namely, FIG. 6 illustrates system 600, according to an example embodiment.

Figure 7:
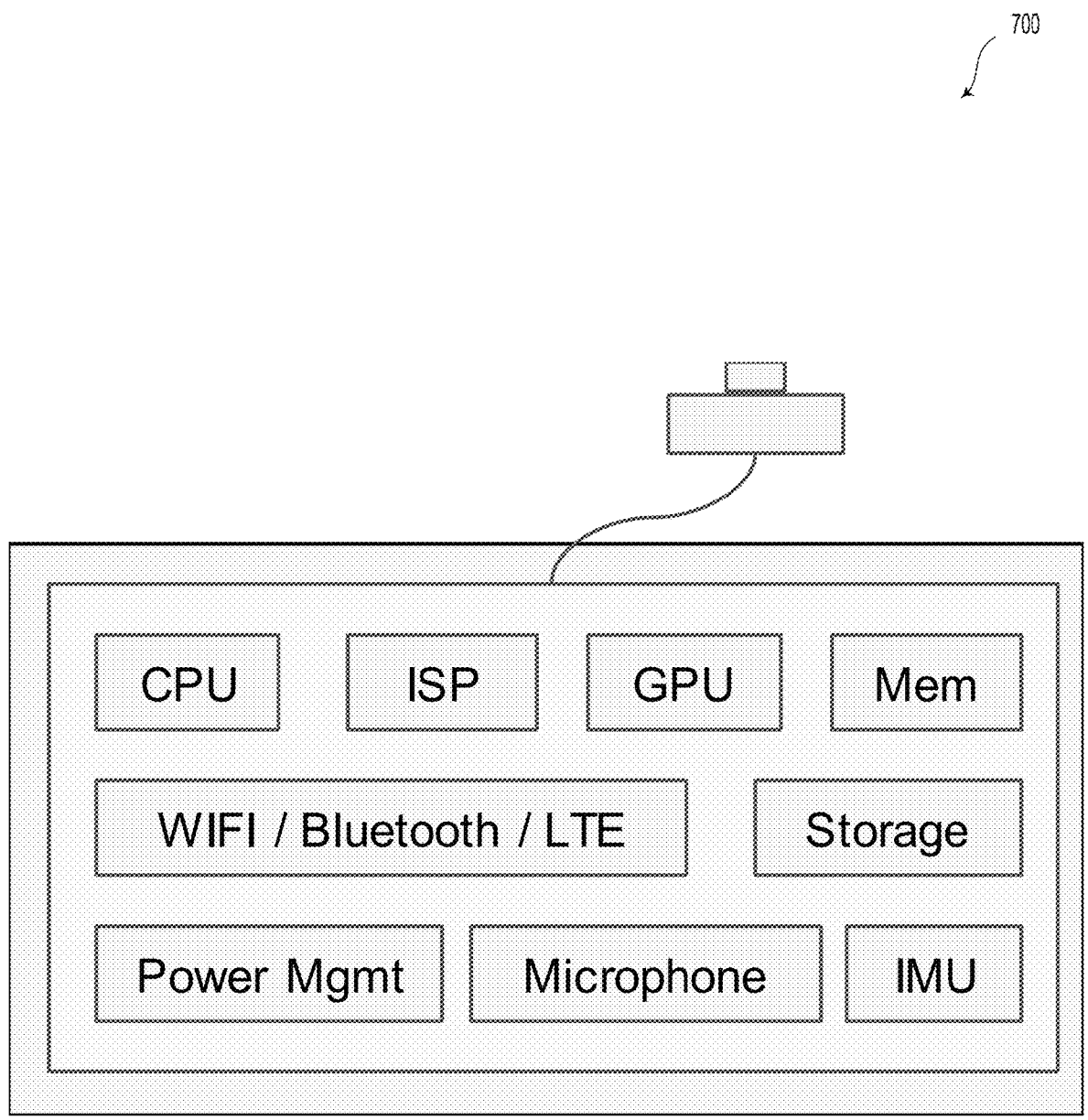
FIG. 7 illustrates system with a detached camera, according to an example embodiment.

In another embodiment, the camera may be physically separated from other components, as shown in FIG. 7. FIG. 7 illustrates a system 700 with a detached camera, according to an example embodiment. Such an arrangement may make it easier to attach cameras to the right position on the VR 360° camera rig.

Each camera unit may also include a microphone, so that all camera units together are able to record and stream sound in different directions.

B. Geometry of VR 360° Camera System

Figure 8:
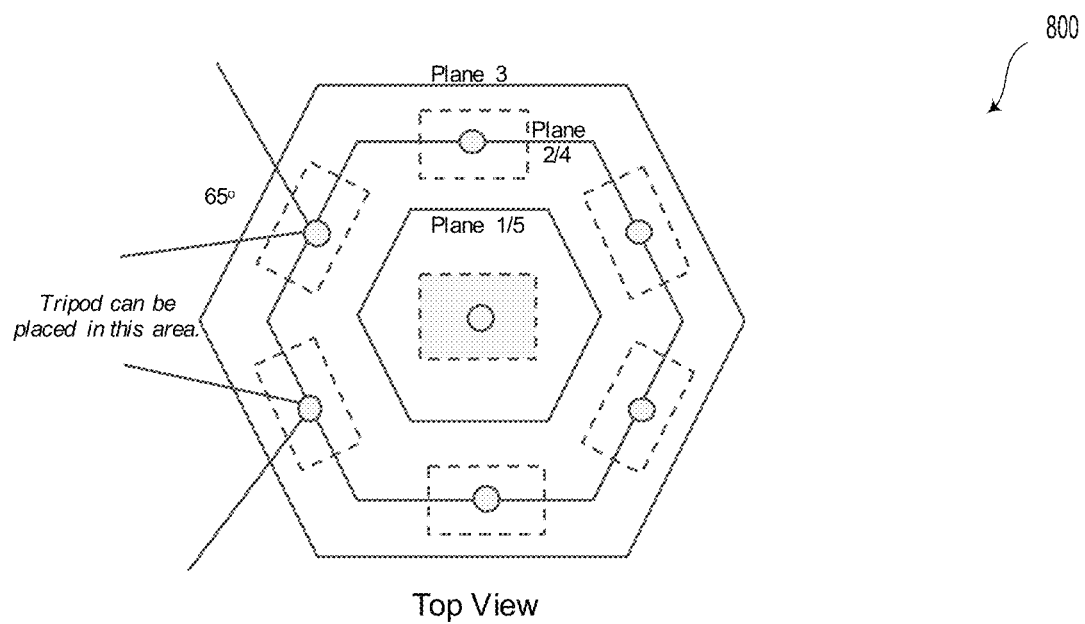
FIG. 8 illustrates geometrical camera arrangement, according to an example embodiment.
Figure 8:
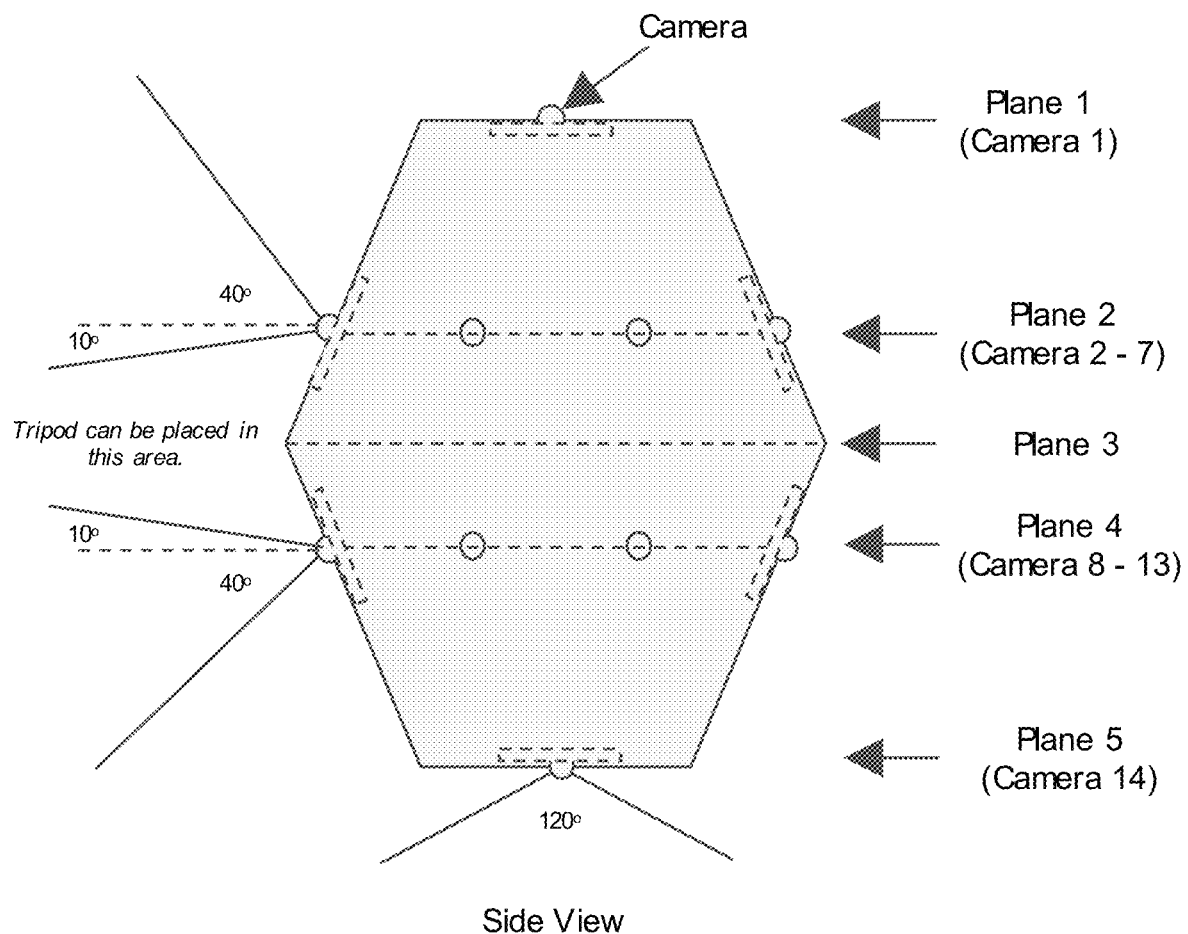

A VR 360° camera system may consist of various numbers of cameras. These cameras can be geometrically arranged in various ways to cover the desired FOV. FIG. 8 illustrates a geometrical camera arrangement 800, according to an example embodiment. FIG. 8 shows an exemplar geometry arrangement of 14 camera units that cover a full sphere of view. Camera 1 on the top (Plane 1) looks upward and covers 100°×100° FOV with a fisheye lens. Cameras 2-7 in Plane 2 look outward and cover a cylinder view of 50°×360° FOV, each of them covering 50°×65° FOV with 5° horizontal overlapping between consecutive (e.g., adjacent and/or neighboring) cameras. The bottom half of the system (e.g., cameras 8-14) may be symmetric with respect to the top half.

Fewer cameras may be implemented if a FOV smaller than sphere is desired, or if each individual camera has a larger FOV. More cameras may be implemented if more overlap between cameras is desired (e.g., for easier stitching, more redundancy), or if each individual camera has a smaller FOV.

In an example embodiment, a pair of cameras may be arranged along each plane (e.g., at each viewpoint) to provide a stereoscopic view for every view.

Also, although this disclosure provides examples involving 360° video, the same method and systems may be applied to provide videos with fields of view that are less than 360°.

C. Interconnection Between Camera Units

In the proposed VR 360° camera system, each camera unit processes video frames in a way that output frames from different camera units that may be directly stitched to form a spherical view, or may be stitched to form a spherical view with a small amount of further processing. In such a scenario, each camera needs to receive information from its neighboring camera units (e.g., neighbor cameras) to perform the image processing (e.g., warping and/or cropping).

Figure 9A:
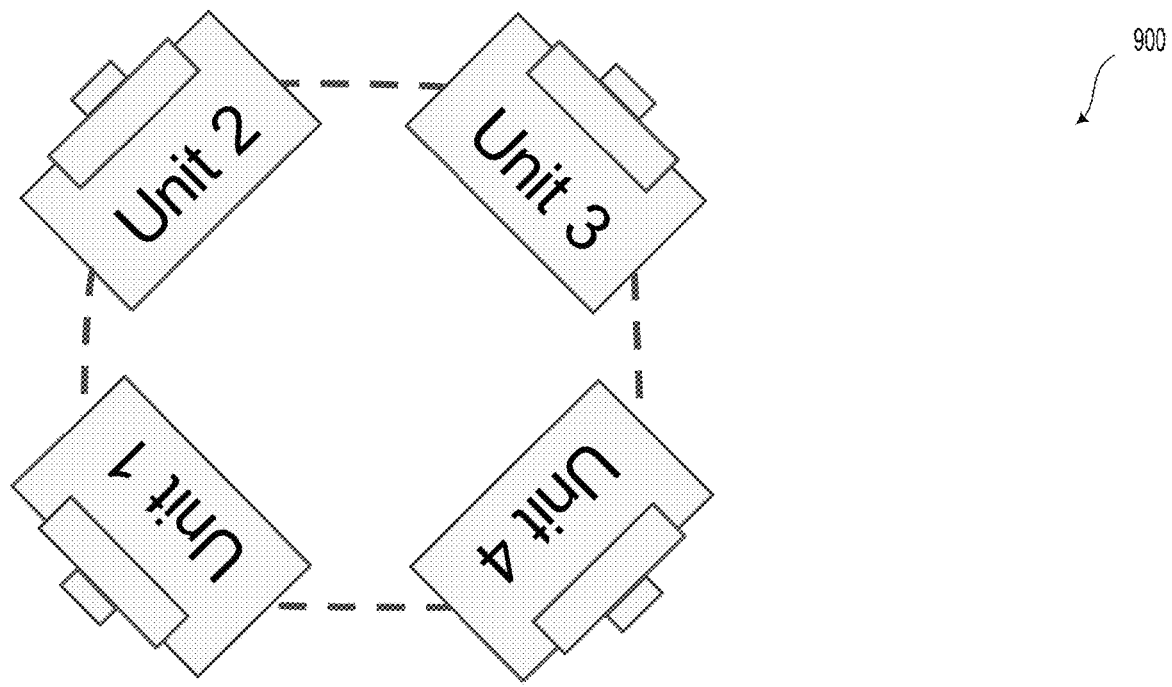
FIG. 9A and 9B illustrate inter-unit connections, according to an example embodiment.
Figure 9B:
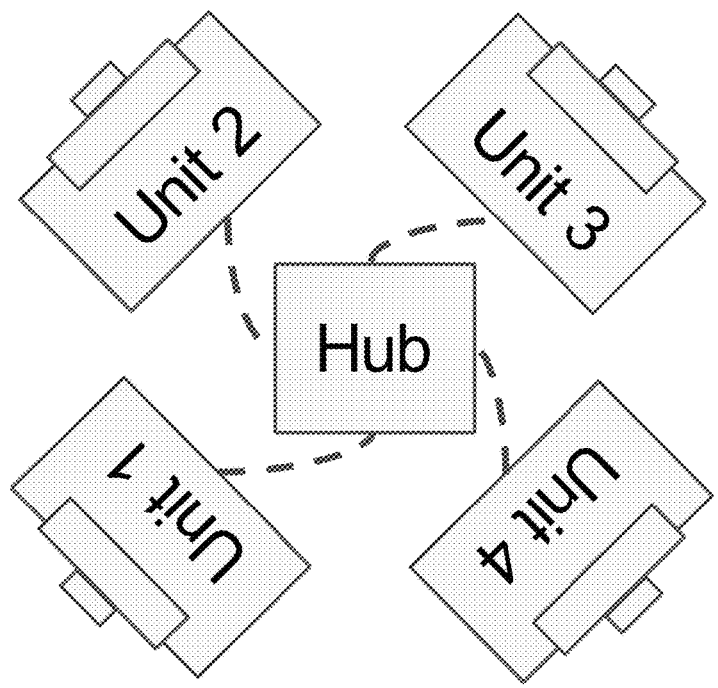

In one embodiment, these camera units are directly connected to one another via a wired or wireless communication interface (e.g., BLUETOOTH, BLUETOOTH LOW ENERGY, WiFi, or another type of communication protocol), as shown in FIG. 9A. FIG. 9A illustrates inter-unit connections. In another embodiment, each camera unit may be connected to a center hub device, via a wired or wireless communication interface as shown in FIG. 9B. This interconnection allows camera units to exchange information for respective image processing on each camera unit at runtime.

In one embodiment, a geometric position of every camera may be pre-calibrated, which may avoid communication between cameras during runtime. This simplifies the system at the cost of stitching quality. For example, high quality stitching is a result of both the geometric arrangement of cameras as well as the spatial position of imaged objects.

Batteries may or may not be included in the integrated units. For example, the imaging system may be externally powered. Additionally or alternatively, batteries may provide some or all power for the imaging system.

In an example embodiment, network devices may be incorporated in the communication link and hardware architecture between the VR camera system and the cloud server so as to speed up or help facilitate the uploading process.

III. Example Methods

A. Camera Synchronization

Each camera unit in the proposed VR 360° camera system captures a portion of a spherical view. To stitch images from each camera together into a 360° image frame (and a 360° video), image capture in each camera unit needs to be synchronized. Camera system clocks may be synchronized based on communication between the cameras. Additionally or alternatively, a synchronizing flash may be fired while the cameras are capturing video. In such a scenario, the cameras may be synchronized by finding the frames from the respective video data that capture the synchronizing flash. Additionally or alternatively, the cameras may be synchronized by analyzing the final video clips (e.g., by stopping the video capture of the cameras at the same time).

If all cameras are synchronized, then for any given time, t, in the target 360° video, one may locate one frame on each video clip that is closest to t, and stitch them together. Linear interpolation may be used here in the temporal dimension for better smoothness.

B. Warping and Cropping for Video Stitching

1. Background

Video stitching difficulty may stem from 1) lens distortion; and 2) field of view disparity between cameras. Lens distortion may be largely corrected by camera calibration which may be done before runtime or at runtime. Camera disparity is scene dependent, and may be addressed using camera overlaps when video is being captured.

Figure 10:
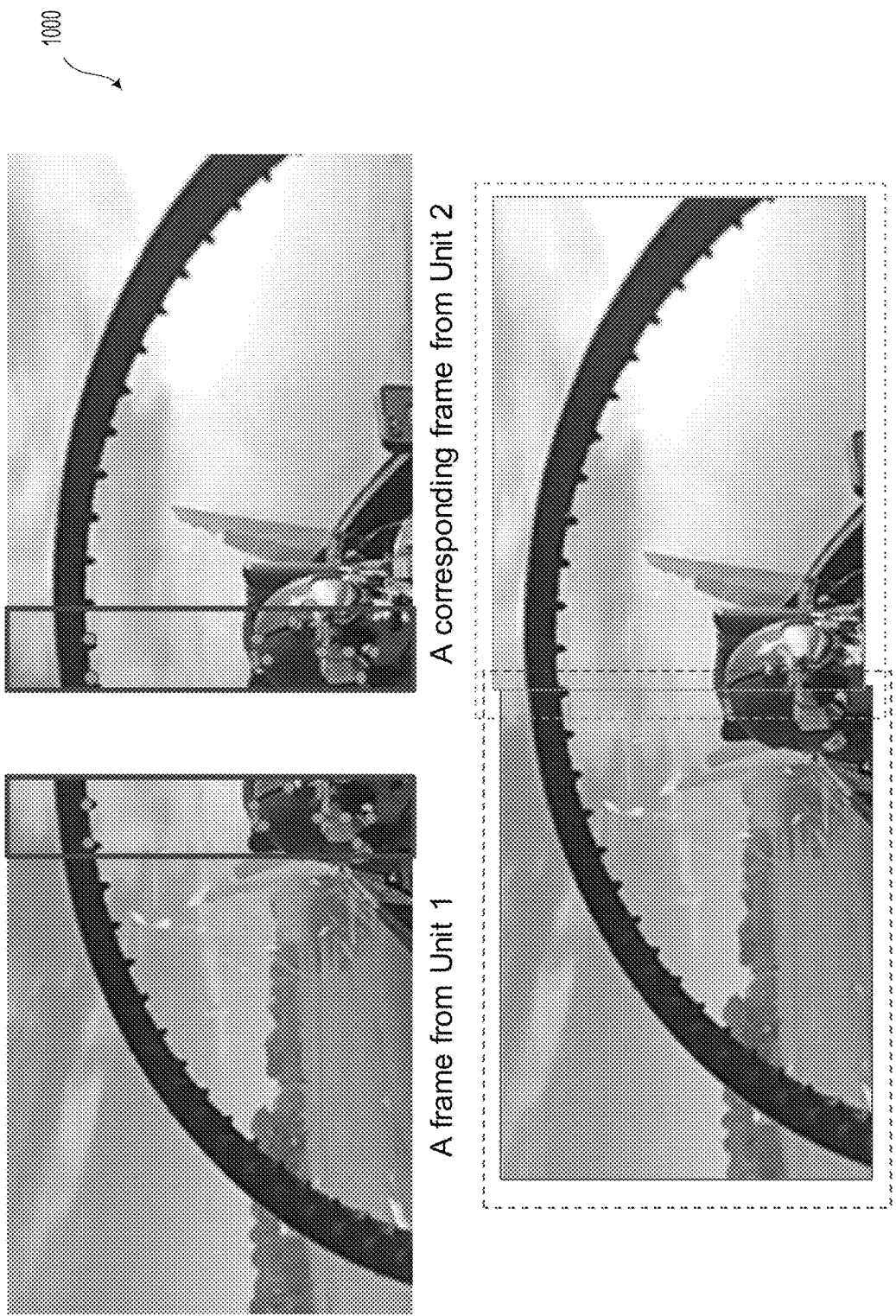
FIG. 10 illustrates warping and cropping in adjacent camera units, according to an example embodiment.

Frames from one camera unit overlap with those from its neighbor camera units. FIG. 10 illustrates two frames from different camera units. Overlapped regions are marked using red rectangles. These overlapping regions are used to warp and crop frames. Once such warping and/or cropping has been performed on the individual frames, the frames can be stitched seamlessly as illustrated.

Information of overlapping regions may be transmitted in various ways. 1) One may transmit to its neighbor camera unit the max possibly overlay regions (as shown in red rectangles in FIG. 10; 2) One may detect feature points (e.g., scale-invariant feature transform (SIFT) points) in these regions, and transmit these feature points to its neighbor camera unit; 3) One may transmit both overlap regions of pixels and detected feature points; 4) One may transmit these information for every frames, or a periodic or aperiodic interval of frames. For example, information about overlap regions may be transmitted to neighbor cameras in response to the captured scene changing by a threshold amount (e.g., based on an image histogram, or another image metric) and/or a feature near the known overlap region moving by more than a threshold distance.

2. Video Warping and Cropping for Each Camera Unit

Figure 11B:
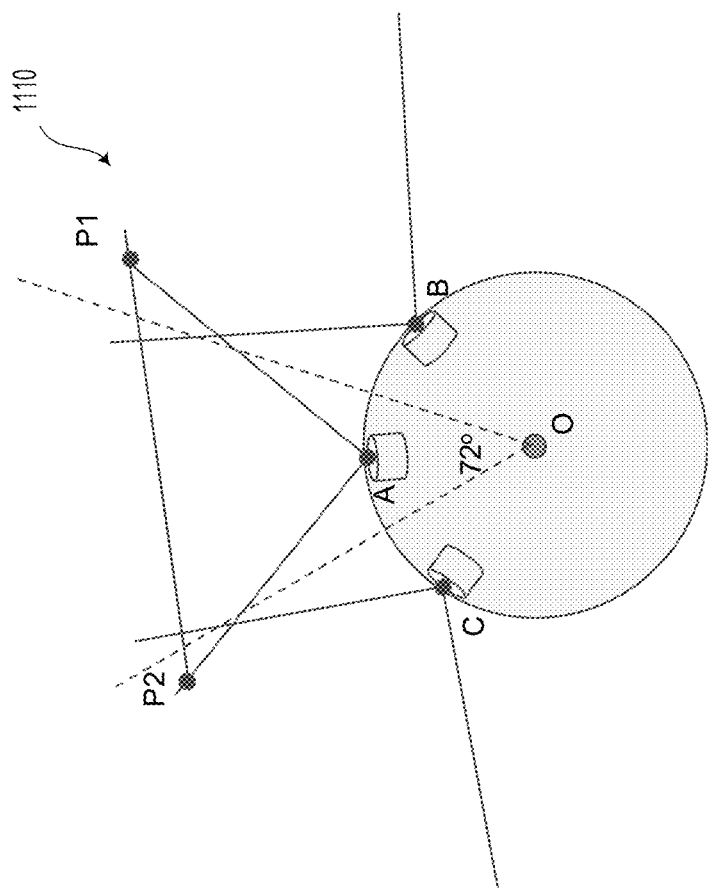
FIGS. 11A and 11B illustrate warping and cropping of image frames by estimating a depth map, according to an example embodiment.
Figure 11A:
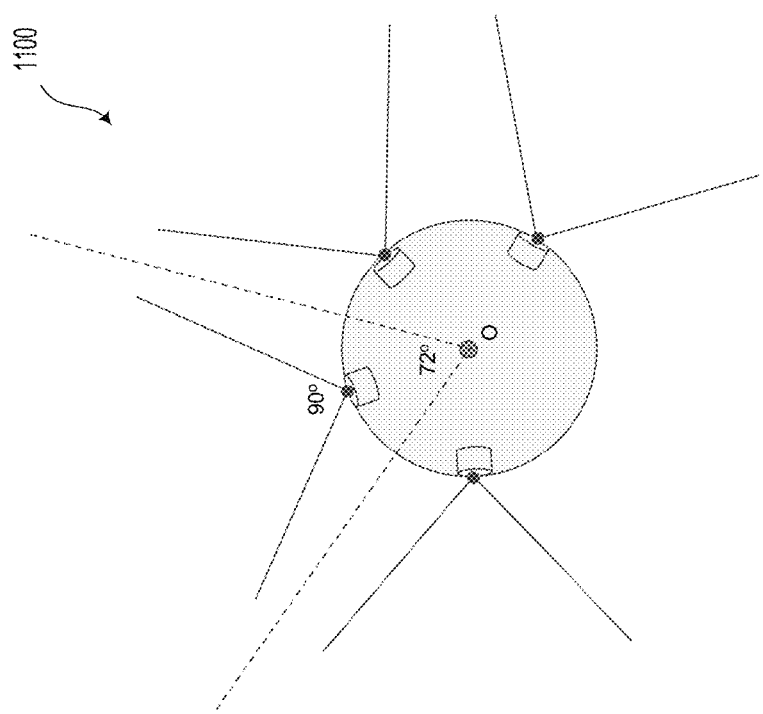

FIGS. 11A and 11B illustrate warping and cropping of image frames by estimating a depth map, according to an example embodiment. FIGS. 11A and 11B show an example in a 2D view where five cameras uniformly distribute in the 360° view, each covers 90° FOV. In one method, each camera unit is responsible for producing a final image of 72° from the point of view of center point, so that combining all frames from five cameras yields one frame of 360° from a single point of view, O. The responsible FOV for each camera unit is pre-determined during calibration.

As shown in FIG. 11B, with an image, F1, from point of view A, and images F2 and F3, from neighbor cameras from Point B and C, respectively, there are various ways to produce an image from a single point of view, O. An example process is shown in FIG. 11B:

1. Between F1 and F2, compute the disparities for the rightmost pixel of F1, P1, and then infer the depth of this pixel.
2. Between F1 and F3, compute the disparities for the leftmost pixel of F1, P2, and then infer the depth of this pixel.
3. Estimate depth of other pixels in F1, use a linear interpolation of the depths of P1 and P2.
4. With depth of every pixel being estimated, we can remap F1 to the targeted 72° for the point of view O.

Figure 12:
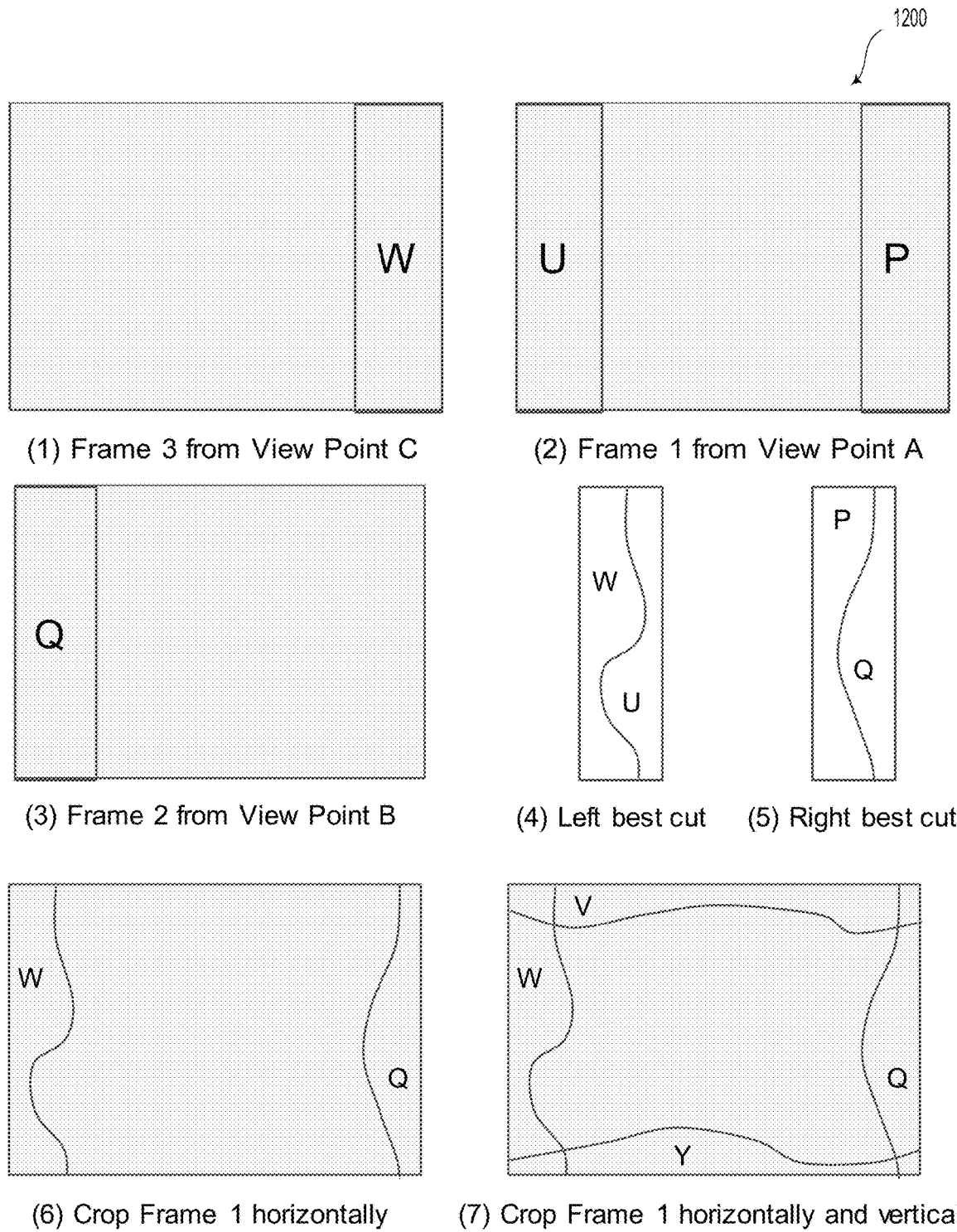
FIG. 12 illustrates warping and cropping of image frames by graph cut, according to an example embodiment.

One need not compute depth explicitly to produce targeted images. Another exemplar solution is as shown in FIG. 12. FIG. 12 illustrates warping and cropping of image frames by graph cut, according to an example embodiment.

1. For each frame from Point A (2), take the possibly overlapping regions. For example, Region W and U from Viewpoint C and A, and Region P and Q from Viewpoint A and B.
2. For each pair of overlapping region, find the best cut that minimizes discontinuities between W and U, and P and Q, as shown in (4) and (5). A number of graph cut algorithms have been proposed in literature.
3. As shown in (6), from Frame 1, crop off Region W and Region Q, and then horizontally warp the rest region into a rect of image.
4. In reality, each frame may have four overlapping regions with its neighbor cameras. As a result, Frame 1 may be cropped in four directions, as shown in (7), W, V, Q, Y. The rest of the regions are then warped horizontally and vertically into the final rectangle image.
5. Cropped and warped frames from all cameras will cover the full spherical view with a reduced amount of stitching artifacts.

In one embodiment, for temporal smoothness, extra smoothness constraints (e.g., performing edge alignment, movement compensation, color/shape matching, tone mapping, exposure correction, etc.) may be posed when finding the best cut between overlapping regions.

This processing may be done for every frame or for a periodic or aperiodic interval of frames. The graph cut (e.g., cropping and warping) may be interpolated based on an estimated movement rate and/or other change in the respective images between image processing periods.

C. Data Storage

Video data from each camera unit may be saved immediately to local storage, or may also be cropped and warped first (as described in the previous session) before saving to a local storage.

Video data may also be encoded (e.g., H.264, VP8, VP9, etc) before saving to one file in a local storage. Video data may also be encoded into a series of small trunk files in a local storage for later streaming (e.g., HLS, DASH).

D. Video Data Upload and Live Stream

Figure 13:
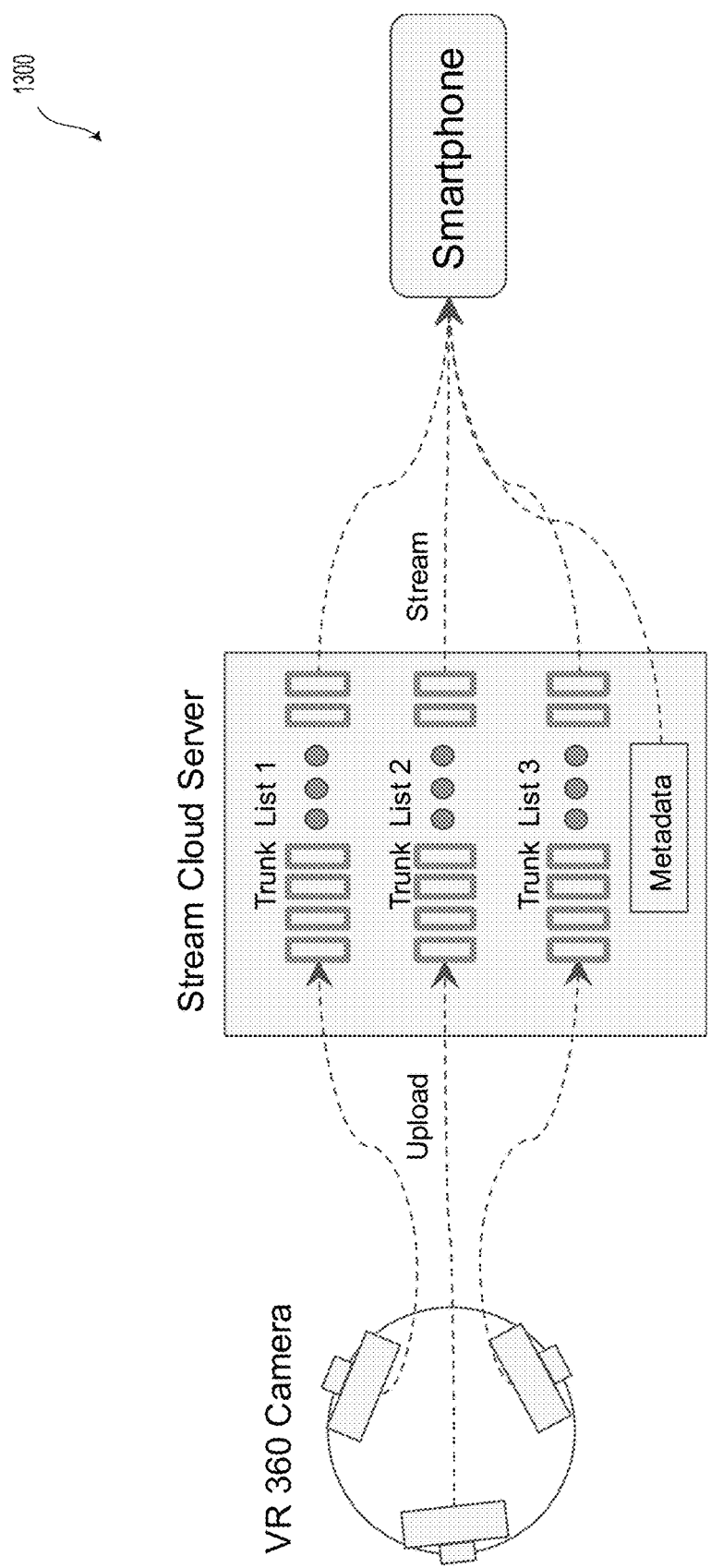
FIG. 13 illustrates a live stream from capturing to consumption, according to an example embodiment.

Regardless of saving to a local storage or not, the processed video data may be uploaded to a cloud in real time. For an example as shown in FIG. 13, as video data is encoded into small trunks, each trunk may be uploaded to a cloud immediately. FIG. 13 illustrates a live stream 1300 from capturing to consumption, according to an example embodiment.

In this case, the cloud may be able to broadcast to a number of users via various streaming protocols (e.g., HLS, DASH, etc).

Note that the VR 360° camera system consists of a number of camera units. Each unit uploads one stream of data to the cloud as shown in FIG. 13. A metadata may be created in the cloud stream server to describe the geometric information of the VR 360° camera system and other video metadata (e.g., framerate, resolution, video format, video/audio codec, etc).

1. Stream and Stitch on Client Application

An application on a client device first grabs the metadata from stream server, and then connects to all the required lists of video trunks. The application is designed to stream and synchronize the required video trunks as needed, stitch them together, render to screen, and so it provides a VR 360° video for end-users. One possible solution of application is described in U.S. Provisional Patent Application No. 62/320,451, filed Apr. 8, 2016.

2. Stitch on Cloud and then Stream to Client Application

One may also stitch video data from all camera units on the cloud. Since all data have already been aligned before uploading, computation for stitching is relatively low and may be done in real-time. After stitching, the stitched video data appears to be a regular video stream, which may be streamed to client devices via regular streaming protocols (e.g., HLS, DASH, etc).

3. Combine Cloud Stitching and Client Stitching

Figure 14:
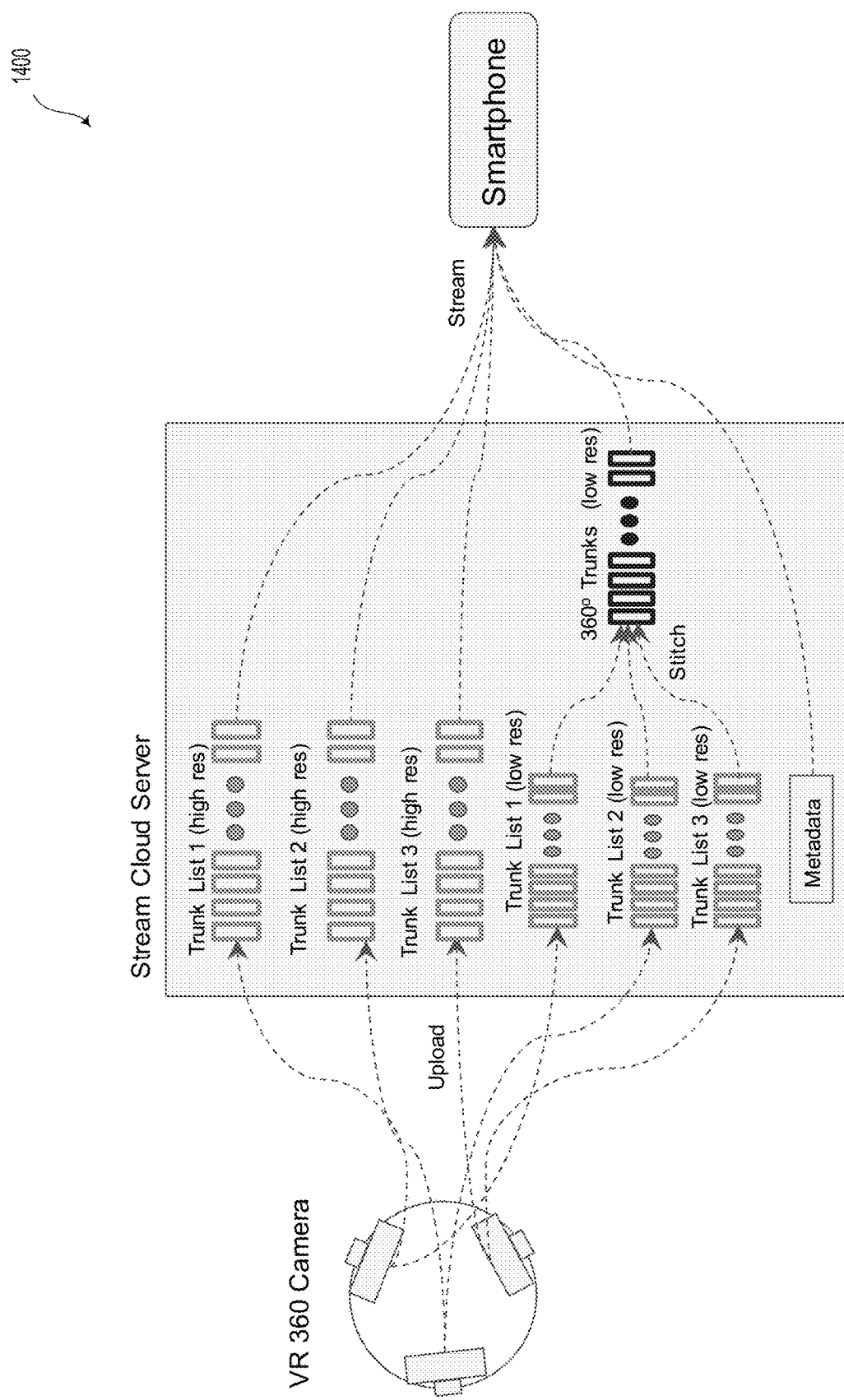
FIG. 14 illustrates a live stream from capturing to consumption, according to an example embodiment.

One may also stitch a low-resolution 360° video on the cloud, and stitch high-resolution 360° video in the client application. To save computation on the cloud, each camera unit in the VR 360° camera system may upload two series of trunks to the cloud, one high-res trunks and one low-res trunks, as shown in FIG. 14. FIG. 14 illustrates a live stream 1400 from capturing to consumption, according to an example embodiment.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

The invention claimed is:

1. An imaging system comprising:
a plurality of cameras configured to capture video image data based on respective fields of view of an environment, wherein each camera of the plurality of cameras is communicatively coupled to neighbor cameras of the plurality of cameras via one or more communication interfaces, wherein each camera of the plurality of cameras comprises at least one processor and a memory, wherein the at least one processor executes instructions stored in memory so as to carry out operations, the operations comprising:
capturing video image data of the respective field of view;
receiving, by at least one camera, via the one or more communication interfaces, information indicative of video image data captured by at least one neighbor camera;
determining, based on the received information, an overlay region, wherein the overlay region comprises an overlapping portion of the video image data captured by the respective camera and the video image data captured by the at least one neighbor camera;
determining an estimated movement rate of the imaging system;
cropping and warping the captured video image data of the respective field of view based on the overlay region to form respective processed video image data, wherein the cropping and warping is based on the determined estimated movement rate;
providing, to a client device via a first communication link, low resolution 360 degree video image data based on the processed video image data; and
providing, to the client device via a second communication link, high resolution 360 degree video image data based on the processed video image data.

2. The imaging system of claim 1, wherein the operations further comprise determining a depth map of at least a portion of the field of view based on the received information.

3. The imaging system of claim 1, wherein the operations further comprise transmitting, via the communication interface, to at least one of the neighbor cameras, information indicative of the overlay region.

4. The imaging system of claim 1, wherein the operations further comprise uploading the processed video image data to a server in real time.

5. The imaging system of claim 1, wherein the operations further comprise:
receiving, via the communication interface, information indicative of a time reference; and
conducting at least one operation based on the time reference.

6. The imaging system of claim 5, wherein the operations further comprise, while capturing the video image data, capturing a synchronization flash in a field of view of the environment, wherein the time reference comprises the synchronization flash.

7. The imaging system of claim 5, wherein the operations further comprise, while capturing the video image data, discontinuing video image data capture for each camera of the plurality of cameras, wherein the time reference comprises at least one timestamp of a respective final video image data frame.

8. The imaging system of claim 1, wherein the operations further comprise determining a portion of overlapping pixels within the overlapping portion of video image data, wherein determining the overlay region is based on the portion of overlapping pixels.

9. The imaging system of claim 1, wherein the operations further comprise determining at least one image feature point within the overlapping portion of video image data, wherein determining the overlay region is based on the image feature point.

10. The imaging system of claim 9, wherein the at least one image feature point comprises at least one structure invariant function transfer (SIFT) point.

11. The imaging system of claim 1, wherein the imaging system comprises a three-dimensional object with fourteen facets and wherein the plurality of cameras comprises at least one camera arranged along each facet.

12. The imaging system of claim 1, wherein the operations further comprise:
in response to the captured video image data of the respective field of view changing by a threshold amount, transmitting information indicative of the determined overlap region to the at least one neighbor camera.

13. The imaging system of claim 5, wherein each camera of the plurality of cameras comprises a respective camera system clock, wherein each camera system clock is synchronized to the other camera system clocks so as to provide the time reference.

* * * * *